United States Patent
Mallick et al.

(10) Patent No.: US 10,474,367 B1
(45) Date of Patent: Nov. 12, 2019

(54) STORAGE SYSTEM WITH INPUT-OUTPUT PERFORMANCE CONTROL UTILIZING APPLICATION PROCESS DETECTION

(71) Applicant: EMC IP Holding Company LLC, Hopkinton, MA (US)

(72) Inventors: Sanjib Mallick, Bangalore (IN); Krishna Deepak Nuthakki, Bangalore (IN); Vinay Rao, Bangalore (IN); Arieh Don, Newton, MA (US); Maneesh Pusalkar, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 15 days.

(21) Appl. No.: 15/849,828

(22) Filed: Dec. 21, 2017

(51) Int. Cl.
*G06F 3/00* (2006.01)
*G06F 3/06* (2006.01)

(52) U.S. Cl.
CPC .............. *G06F 3/061* (2013.01); *G06F 3/065* (2013.01); *G06F 3/067* (2013.01); *G06F 3/0626* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| | | |
|---|---|---|
| 6,687,746 B1 | 2/2004 | Shuster et al. |
| 6,697,875 B1 | 2/2004 | Wilson |
| 7,454,437 B1 | 11/2008 | Lavallee et al. |
| 7,818,428 B1 | 10/2010 | Lavallee et al. |
| 7,925,872 B2 | 4/2011 | Lai et al. |
| 9,594,780 B1 | 3/2017 | Esposito et al. |
| 9,778,852 B1 | 10/2017 | Marshak et al. |
| 2004/0010563 A1 | 1/2004 | Forte et al. |
| 2008/0043973 A1 | 2/2008 | Lai et al. |
| 2011/0197027 A1 | 8/2011 | Balasubramanian et al. |
| 2012/0159474 A1* | 6/2012 | Chakhaiyar .......... G06F 3/0611 718/1 |

(Continued)

OTHER PUBLICATIONS

Vmware, "Multipathing Configuration for Software iSCSI Using Port Binding," Technical White Paper, Apr. 25, 2012, 15 pages.

(Continued)

*Primary Examiner* — Midys Rojas
(74) *Attorney, Agent, or Firm* — Ryan, Mason & Lewis, LLP

(57) ABSTRACT

A storage array in one embodiment is configured to communicate over one or more networks with a plurality of host devices. The storage array is further configured to detect process tags assigned to respective input-output operations by a given one of the host devices, the process tags being of at least first and second distinct types so as to distinguish at least respective first and second distinct processes generating corresponding ones of the input-output operations on the given host device. Responsive to a particular one of the detected process tags being of the first type, the storage array provides a first level of priority for processing of the corresponding input-output operation, and responsive to a particular one of the detected process tags being of the second type, the storage array provides a second level of priority different than the first level of priority for processing of the corresponding input-output operation.

20 Claims, 2 Drawing Sheets

(56) References Cited

U.S. PATENT DOCUMENTS

2016/0117113 A1    4/2016  Li et al.

OTHER PUBLICATIONS

Dell EMC, "Dell EMC SC Series Storage: Microsoft Multipath I/O," Dell EMC Engineering, Jun. 2017, 56 pages.
U.S. Appl. No. 15/795,653 filed in the name of Maneesh Pusalkar et al. on Oct. 27, 2017 and entitled "Storage System with Network-Wide Configurable Device Names."

* cited by examiner

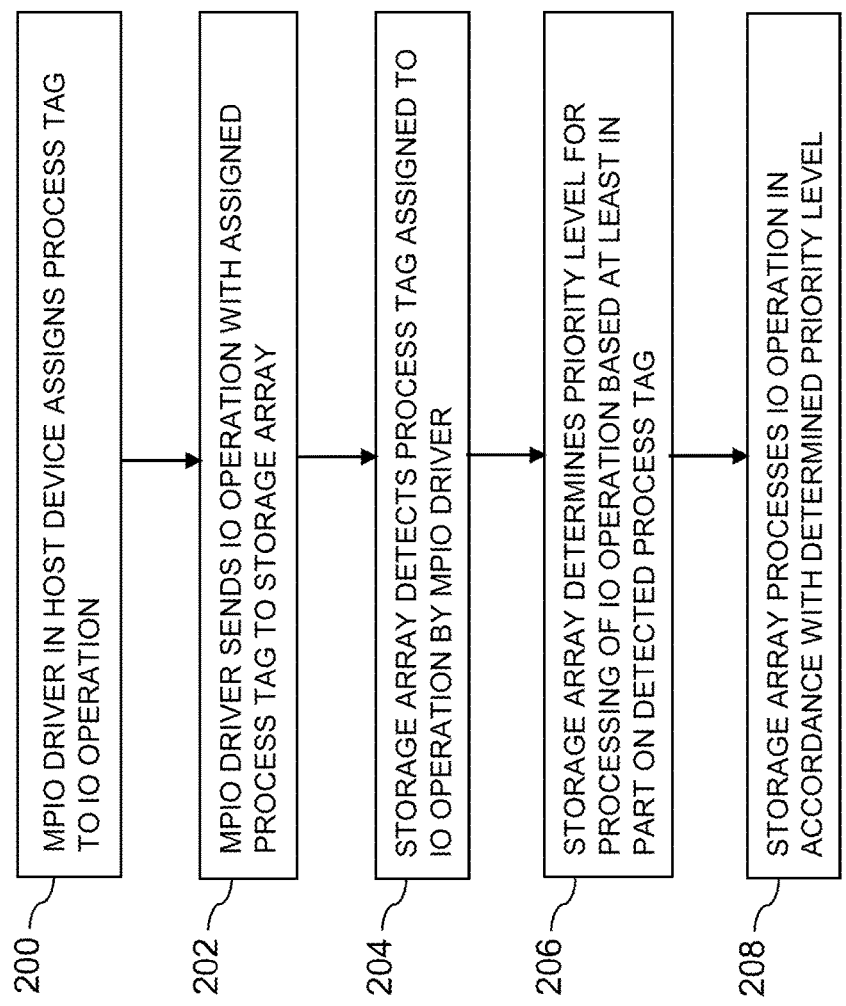

US 10,474,367 B1

STORAGE SYSTEM WITH INPUT-OUTPUT PERFORMANCE CONTROL UTILIZING APPLICATION PROCESS DETECTION

FIELD

The field relates generally to information processing systems, and more particularly to storage in information processing systems.

BACKGROUND

A wide variety of different types of storage systems are known. For example, some storage systems are configured to include multiple storage tiers, with different ones of the tiers providing different levels of performance or other characteristics. In such storage systems, data may be moved from one tier to another within a given storage system based on access frequency of the data or other factors. These and other types of tiered or non-tiered storage systems may be shared by multiple host devices of a compute cluster. However, problems can arise in such arrangements in that some storage systems are configured to differentiate performance only on the basis of a storage device or a group of storage devices. A user desiring different levels of performance for different processes of an application running on a host device may therefore have to designate separate storage devices or groups of storage devices within the storage system for handling input-output operations of each of the different processes of the application. Another possible approach is for the host device to provide out-of-band hints indicating particular storage device extents that are used by the different processes, but such an approach is unduly complex and can adversely impact input-output performance. For example, the storage device extents used by the different processes can dynamically change over time and therefore must be carefully managed on both the host devices and the storage array.

SUMMARY

Illustrative embodiments of the present invention provide storage systems configured with functionality for input-output performance control utilizing application process detection. These and other embodiments overcome the problems that can otherwise result when utilizing storage systems that differentiate performance only on the basis of a storage device or a group of storage devices. For example, some embodiments can provide different levels of performance for input-output operations of different processes of an application running on a given host device even when the input-output operations of the different processes are all directed to the same storage device or group of devices within a storage array. Such arrangements can avoid the need for a user to designate separate storage devices or groups of storage devices within a storage system for handling input-output operations of each of the different processes of the application, while also avoiding the complexities and potential performance impacts of the above-noted out-of-band hinting approach.

In one embodiment, a storage system comprises at least one storage array comprising a plurality of storage devices. The storage array is configured to communicate over one or more networks with a plurality of host devices. The storage array is further configured to detect process tags assigned to respective input-output operations by a given one of the host devices, the process tags being of at least first and second distinct types so as to distinguish at least respective first and second distinct processes generating corresponding ones of the input-output operations on the given host device. Responsive to a particular one of the detected process tags being of the first type, the storage array provides a first level of priority for processing of the corresponding input-output operation, and responsive to a particular one of the detected process tags being of the second type, the storage array provides a second level of priority different than the first level of priority for processing of the corresponding input-output operation.

The storage array is thereby configured to provide different levels of priority for processing different ones of the input-output operations generated by different ones of the processes responsive to the process tags assigned to the respective input-output operations by the given host device. The process tags are illustratively assigned to the respective input-output operations by a multi-path input-output (MPIO) driver of the given host device.

In some embodiments, the storage array comprises a plurality of priority queues having respective different priority levels. The storage array in an arrangement of this type is configured to provide different priority levels for different ones of the input-output operations by assigning different ones of the input-output operations to different ones of the priority queues based at least in part on their respective detected process tags. Respective ones of the plurality of queues are illustratively associated with respective distinct service level objectives (SLOs) for processing of input-output operations in the storage array.

The first and second processes in some embodiments comprise respective log and database processes of a database application. In such an arrangement, input-output operations generated by the log process of the database application are provided with a higher priority level for processing in the storage array than input-output operations generated by the database process of the database application. A wide variety of other types of processes and applications can be used in other embodiments.

These and other illustrative embodiments include, without limitation, apparatus, systems, methods and computer program products comprising processor-readable storage media.

BRIEF DESCRIPTION OF THE DRAWINGS

FIG. 2 is a flow diagram of a process for input-output performance control utilizing application process detection in the information processing system of FIG. 1.

DETAILED DESCRIPTION

Figure 1:
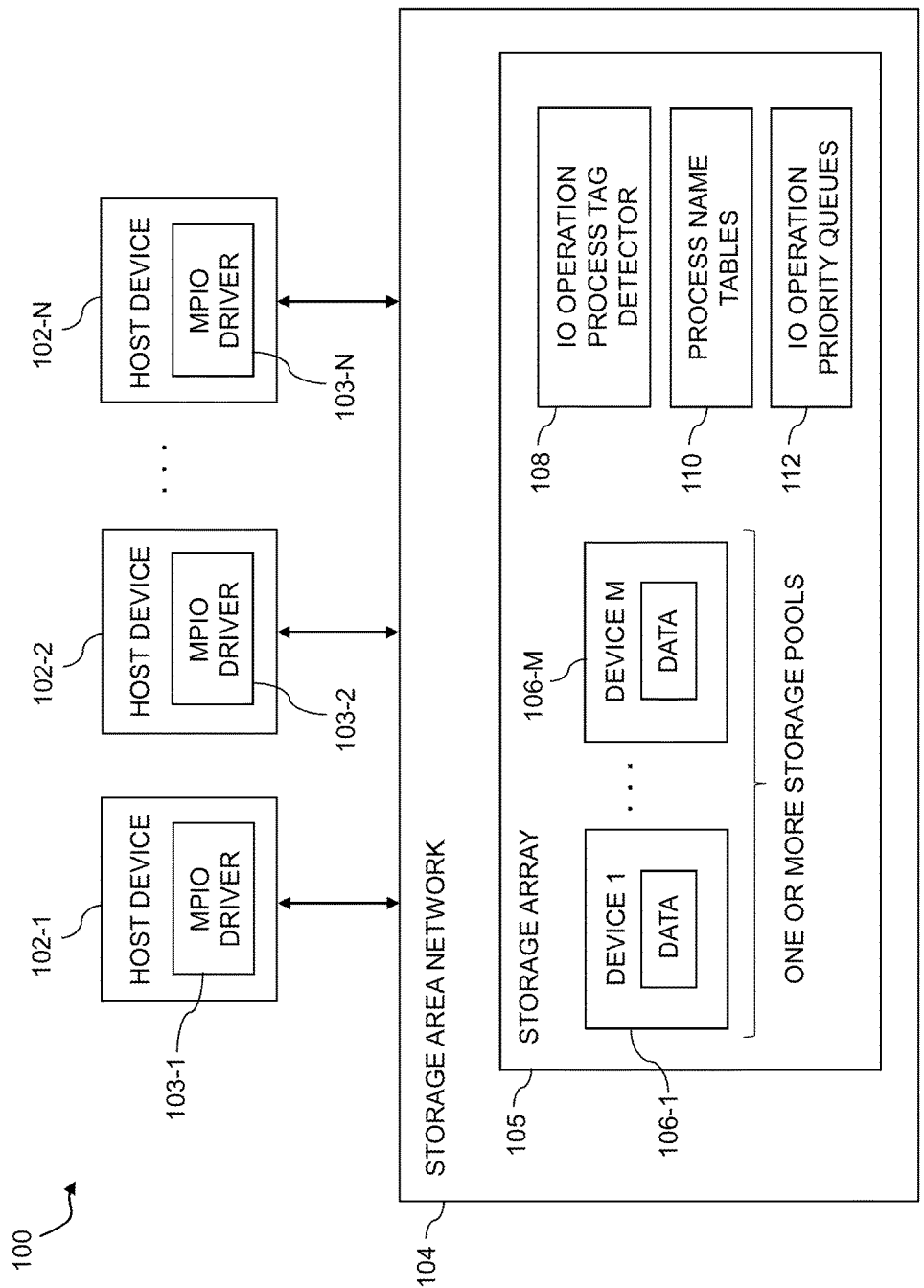
FIG. 1 is a block diagram of an information processing system comprising a storage system configured with functionality for input-output performance control utilizing application process detection in an illustrative embodiment.

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

FIG. 1 shows an information processing system 100 configured in accordance with an illustrative embodiment. The information processing system 100 comprises a plurality of host devices 102-1, 102-2, . . . 102-N having respective multi-path input-output (MPIO) drivers 103-1, 103-2, . . . 103-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The MPIO drivers 103 are illustratively configured utilizing well-known MPIO functionality such as that described in K. Piepho, "Dell EMC SC Series Storage: Microsoft Multipath I/O," Dell EMC Engineering, June 2017, which is incorporated by reference herein. Such MPIO functionality is suitably modified herein to support implementation of IO performance control utilizing application process detection.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 and the storage array 105 in the present embodiment are configured to implement process tag based IO performance control functionality for one or more applications running on the host devices 102. For example, the MPIO drivers 103 of the respective host devices 102 are illustratively configured to assign process tags to respective IO operations directed by the host devices 102 to the storage array 105. Different process tags illustratively correspond to respective distinct processes of a given application, such as a distributed application running on multiple ones of the host devices 102. The storage array 105 is configured to detect the process tags and to provide different levels of performance for different processes based at least in part on the process tags assigned to IO operations generated by those processes. As will be described in more detail below, such an arrangement can avoid the above-described drawbacks associated with conventional approaches that differentiate performance only on the basis of a storage device or a group of storage devices.

The process tag based IO performance control functionality implemented in the storage array 105 is provided at least in part by an IO operation process tag detector 108 and a set of process name tables 110 that are assumed to be stored in persistent memory of the storage array 105. The process tag based IO performance control functionality implemented in the storage array 105 in the present embodiment also utilizes a set of IO operation priority queues 112 of the storage array 105.

The persistent memory may comprise a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

In operation, the IO operation process tag detector 108 of the storage array 105 receives commands from a given one of the host devices 102. The commands are illustratively associated with respective IO operations such as read operations or write operations that respectively involve reading data from or writing data to one or more of the storage devices 106 of the storage array 105. The given host device assigns process tags to respective ones of the IO operations before sending those IO operations to the storage array 105, with each such IO operation being in the form of one or more commands. The commands are illustratively modified to incorporate the assigned process tags.

The IO operation process tag detector 108 is configured to detect the process tags assigned to respective IO operations by the given one of the host devices 102. The process tags are illustratively of at least first and second distinct types so as to distinguish at least respective first and second distinct processes generating corresponding ones of the IO operations on the given host device. The first and second distinct processes are assumed to comprise distinct processes of a single application running on one or more of the host devices 102, although other arrangements are possible.

Responsive to a particular one of the detected process tags being determined by the IO operation process tag detector 108 to be of the first type, the storage array 105 provides a first level of priority for processing of the corresponding IO operation. Similarly, responsive to a particular one of the detected process tags being determined by the IO operation process tag detector 108 to be of the second type, the storage array 105 provides a second level of priority different than the first level of priority for processing of the corresponding IO operation. The storage array 105 is thereby configured to provide different levels of priority for processing different ones of the IO operations generated by different ones of the processes responsive to the process tags assigned to the respective IO operations by the given host device.

Terms such as "level of priority" and "priority level" as used herein are intended to be broadly construed, and can encompass a wide variety of different types of distinct processing that can be applied within storage array 105 to IO operations generated by respective distinct processes of one or more applications running on host devices 102.

In some embodiments, the process tags are assigned to the respective IO operations by the MPIO drivers 103 of the respective host devices 102. For example, the process tags may be assigned to the respective IO operations in a kernel-space portion of the MPIO driver of the given host device. Alternatively, assignment of process tags to respective IO operations may occur solely in a user-space portion of the MPIO driver, or using cooperative interaction between the user-space and kernel-space portions of the MPIO driver, instead of solely in the kernel-space portion of the MPIO driver.

As noted above, the IO operations each illustratively comprise one or more SCSI commands, suitably modified to incorporate a corresponding assigned process tag. The commands utilized in a given embodiment can include commands that are part of a standard command set or may include custom commands such as a "vendor unique command" or VU command that is not part of a standard command set.

For example, in some embodiments, the process tags are assigned to respective ones of the IO operations by incorporating the process tags into respective command descriptor blocks of corresponding commands directed from the given host device to the storage array 105. More particularly, a given one of the process tags for one of the IO operations may be incorporated into a group number field of the command descriptor block of the corresponding command. Additionally or alternatively, the process tag may be incorporated into a VU field of the command descriptor block of the corresponding command. Numerous other arrangements are possible. For example, different portions of a given process tag for one of the IO operations can be inserted into respective different commands in an arrangement in which the IO operation comprises multiple commands.

Again, the commands illustratively comprise respective SCSI commands, although as noted above other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Although in some embodiments there is a one-to-one correspondence between IO operations and commands, this is not a requirement, and as indicated above some IO operations can involve multiple distinct commands.

The storage array 105 utilizes its IO operation priority queues 112 to provide different levels of performance for IO operations generated by different processes and therefore having different process tags. The IO operation priority queues 112 in this embodiment have respective different priority levels. The storage array 105 is configured to provide different priority levels for different ones of the IO operations by assigning different ones of the IO operations to different ones of the IO operation priority queues 112 based at least in part on their respective detected process tags.

The IO operation priority queues 112 are illustratively associated with respective distinct service level objectives (SLOs) for processing of IO operations in the storage array 105. Accordingly, different SLOs can be specified for different processes of a given application running on one or more of the host devices 102 by those host devices assigning different process tags to the IO operations generated by different ones of the processes of the given application. The IO operation process tag detector 108 of storage array 105 detects the process tags and directs the IO operations to different ones of the IO operation priority queues 112 based at least in part on the detected process tags.

As one possible example, the first and second processes may comprise respective log and database processes of a database application. The IO operations generated by the log process of the database application are each assigned a process tag of a first type and are provided with a higher priority level for processing in the storage array 105 than IO operations generated by the database process of the database application. Those latter IO operations generated by the database process are each assigned a process tag of a second type that is distinct from the process tag of the first type.

It is also possible that more than two different priority levels can be used. For example, the storage array 105 can be configured to provide the following set of multiple priority levels in the context of a database application having log and database processes, in order of decreasing priority:

1. A first priority level for write operations of a log process of a database application.
2. A second priority level for read operations of the log process of the database application.
3. A third priority level for read operations of a database process of the database application.
4. A fourth priority level for write operations of a database process of the database application.

Again, this is only an example, and a wide variety of different types of applications, processes and priority levels can be used. Accordingly, illustrative embodiments are not limited to log and database processes, but are more generally applicable to any set of multiple processes of a given application for which different priorities in processing of corresponding IO operations by the storage array 105 is desired.

As further examples, the multiple processes that are assigned distinct process tags and provided with different levels of priority in the storage array 105 can include respective index and scrubbing processes, or respective database processes of two different types. Numerous other distinct processes of a given application can be assigned detectable process tags and provided with different levels of priority for processing of IO operations in the storage array 105 using the techniques disclosed herein.

It should also be noted that the use of IO operation priority queues 112 associated with respective distinct SLOs is not limiting and can be varied in other embodiments. For example, some embodiments can be configured to utilize alternative arrangements for providing different levels of priority for processing IO operations from distinct processes assigned different detectable process tags.

Illustrative embodiments can provide different levels of performance for IO operations of different processes of an application running on a given host device even when the IO operations of the different processes are all directed to the same storage device or group of devices within the storage array 105. For example, the storage array 105 is illustratively configured to direct one or more IO operations having detected process tags of a first type and one or more IO operations having detected process tags of a second type to storage devices having a same device type, but from different ones of the IO operation priority queues 112. Such an arrangement can advantageously avoid the need for a user to designate separate storage devices or groups of storage devices within the storage array 105 system for handling IO operations of each of the different processes of the application, while also avoiding the complexities and potential performance impacts of conventional approaches such as the out-of-band hinting approach described previously.

The storage array 105 in the FIG. 1 embodiment stores a plurality of process name tables 110. A given one of the process name tables 110 provides a mapping between a plurality of process names and their respective process tags. There may be different process name tables for different applications or multiple applications can share a common process name table.

One or more of the host devices 102 can each read the given process name table from a persistent memory of the storage array 105, possibly in conjunction with a boot process of the given host device. Such an arrangement allows the host devices 102 and the storage array 105 to collectively maintain an appropriate correspondence between process names of one or more applications and the process tags that are assigned to IO operations generated by those processes by the host devices 102 and detected by the storage array 105.

References above to functions performed by a given one of the host devices 102 should not be viewed as limiting in any way. To the contrary, it is assumed that each of the other host devices 102 can similarly generate IO operations each comprising one or more commands via its corresponding MPIO driver with each such IO operation having an assigned process tag detectable by the storage array 105.

In addition, the functions described above as being performed by the IO operation process tag detector 108 in the present embodiment can alternatively be performed at least in part by one or more other components of the storage array 105, such as a storage controller, although that component is not explicitly illustrated in the figure. It is also possible that the IO operation process tag detector 108 can be incorporated into a storage controller of the storage array. Other types of processing circuitry within the storage array 105 can be used to implement functionality for detection of process tags of respective IO operations and provision of corresponding different levels of performance for different processes of a given application based at least in part on the detected process tags.

The host devices 102 are assumed to comprise respective command generators for generating the one or more commands for each IO operation. Such command generators are illustratively implemented at least in part in the form of software executed by the respective host devices 102, although other arrangements are possible.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. The term "storage device" as used herein is intended to be broadly construed, so as to encompass, for example, disk drives, flash drives, solid-state drives, hybrid drives or other types of storage products and devices.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to implement process tag based IO performance control functionality as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, MPIO drivers 103, SAN 104, storage array 105, storage devices 106, IO operation process tag detector 108, process name tables 110, and IO operation priority queues 112 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising multiple host devices and a shared storage system. The shared storage system in this embodiment is assumed to comprise at least one storage array having a plurality of storage devices. Steps 200 and 202 in the present embodiment are illustratively performed primarily by a given host device, and steps 204 through 208 are performed primarily by the storage array, although other arrangements of system components can perform at least portions of one or more of the steps in other embodiments. This embodiment further assumes that the commands utilized by the host devices in generating IO operations such as read and write operations directed to the storage array comprise SCSI commands, although other types of commands can be used.

In step 200, an MPIO driver of a given host device assigns a process tag to an IO operation. As indicated previously, the assignment of the process tag to the IO operation may occur in a kernel-space portion of the MPIO driver of the given host device, although other process tag assignment arrangements are possible.

In some embodiments, process tags are assigned to respective IO operations by incorporating the process tags into respective command descriptor blocks of corresponding commands directed from the given host device to the storage array. For example, a given one of the process tags may be incorporated at least in part into a group number field of the command descriptor block of the corresponding command. Additionally or alternatively, the given process tag can be incorporated at least in part into a VU field of the command descriptor block of the corresponding command. It is therefore possible in some embodiments that different portions of the given process tag can be incorporated into different parts of a command descriptor block, or in one or more other parts of a corresponding command. The term "process tag" as used herein is therefore intended to be broadly construed and in some embodiments may be distributed across multiple distinct command fields of a particular IO operation. The corresponding commands illustratively comprise respective SCSI commands.

Again, these particular command format features are examples only, and numerous other SCSI or non-SCSI command formats may be used in other embodiments, including VU commands or other user-defined commands.

In step 202, the MPIO driver sends the IO operation with its assigned process tag to the storage array. The storage array is illustratively configured under processor control to comprise a plurality of storage devices and to communicate over one or more networks with the given host device and one or more other host devices. For example, references herein to "configuring a storage array" may involving retrieving particular software program code from a memory of the storage array and executing that software program code on one or more processing devices of the storage array. Numerous other techniques can be used to configure a storage array in illustrative embodiments.

In step 204, the storage array detects the process tag assigned to the IO operation by the MPIO driver.

In step 206, the storage array determines the priority level for processing of the IO operation based at least in part on the detected process tag.

In step 208, the storage array processes the IO operation in accordance with the priority level determined in step 206.

By way of example, in some implementations of the FIG. 2 process, the process tags assigned to respective IO operations by the given host device are of at least first and second distinct types so as to distinguish at least respective first and second distinct processes generating corresponding ones of the IO operations on the given host device. Responsive to a particular one of the detected process tags being of the first type, the storage array provides a first level of priority for processing of the corresponding IO operation, and responsive to the particular one of the detected process tags being of the second type, the storage array provides a second level of priority different than the first level of priority for processing of the corresponding IO operation. The storage array thereby provides different levels of priority for processing different ones of the IO operations generated by different ones of the processes responsive to the process tags assigned to the respective IO operations by the given host device.

The different levels of priority are implemented in some embodiments by providing within the storage array multiple priority queues having respective different priority levels. The storage array can then provide different priority levels for different ones of the IO operations by assigning different ones of the IO operations to different ones of the priority queues based at least in part on their respective detected process tags.

After completion of step 208 for a given IO operation, the FIG. 2 process returns to step 200 or 202 in order to process additional IO operations having assigned process tags. For example, the FIG. 2 process may be iterated to process multiple IO operations from the given host device or from multiple host devices. Multiple such iterations may be performed at least in part in parallel with one another.

It is to be appreciated that the FIG. 2 process can be adapted for use with other types of information systems, including by way of example an information processing system in which multiple host devices and a shared storage system are all implemented on the same processing platform.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and process tag based IO performance control functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different process tag based IO performance control arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

An additional example of an illustrative embodiment implemented using the FIG. 2 process for performing process tag based IO performance control will now be described. In this embodiment, it is assumed that the MPIO drivers of the respective host devices automatically assign process tags to IO operations.

It is further assumed that an application (e.g., a database application such as Oracle DB) running on one or more of the host devices utilizes multiple distinct processes that generate IO operations directed to the storage array. The processes include a log process and a database process. In order to ensure optimal overall performance of the database application, it is desirable to provide IO operations generated by the log process of the database application with a higher level of priority than IO operations generated by the database process of the database application. The database process IO operations are typically asynchronous and do not impact the overall performance to the same extent as the log process IO operations. The present embodiment avoids the need for a user to designate separate devices or groups of devices for the log and database processes in order to provide different priorities for processing of the corresponding IO operations in the storage array. Instead, different process tags are associated with the respective log and database processes, and assigned by one or more of the host devices to IO operations generated by those processes, so as to be detectable by the storage array. The assignment of process tags to IO operations illustratively occurs in the MPIO drivers of the host devices, as described elsewhere herein.

A given MPIO driver (e.g., a PowerPath driver) learns a process name for each process that generates IO operations. The process names have respective associated process tags that map to different priority levels for processing of the corresponding IO operations in the storage array. For example, an Oracle DB application can have a log process named "OracleLOG" that generates the log process IO operations and a database process named "OracleDB" that generates the database process IO operations. Similar process naming conventions may be used for multiple processes of other database applications, as well as for processes of other types of non-database applications running on the host devices. Each of the process names has a corresponding process tag. The MPIO driver attaches the appropriate process tag to each IO operation generated by one of the processes of the database application. This process tag is detectable by the storage array, and identifies to the storage array the particular application process that generated the corresponding IO operation.

The storage array will then alter its manner of processing a given received IO operation based at least in part of the corresponding detected process tag. This may involve directing IO operations from different processes to different ones of a plurality of IO operation priority queues of the storage array, or to different performance tiers of the storage array. For example, all write operations generated by the OracleLOG process may be handled using a higher priority queue or performance tier than write operations generated by the OracleDB process. Such an arrangement ensures that the storage array will apply the appropriate priority level to each IO operation utilizing its detected process tag. This is achieved without requiring a user to separate application process IO operations between different device types within the storage array. Application configuration is therefore greatly simplified.

Although the foregoing example is illustrated with respect to processes of a single application, it is possible to extend this approach to process tagging of multiple distinct applications. For example, the storage array can be directed through the use of process tags to provide higher performance to one application (e.g., an Oracle database application) than to another (e.g., a Microsoft SQL database application), with the storage array providing higher performance to IO operations tagged as Oracle-log/DB than to IO operations tagged as SQL-log/DB.

In this case, a given process tag indicates both the application and multiple processes within that application. The term "process tag" as used herein may therefore encompass a tag that is used to identify multiple processes of one application relative to multiple processes of another application.

Again, it is to be appreciated that the particular process tagging arrangements described above are presented by way of illustrative example only. Numerous alternative arrangements of these and other features can be used in implementing the FIG. 2 process and other illustrative embodiments.

Illustrative embodiments disclosed herein can provide a number of significant advantages relative to conventional arrangements.

For example, one or more embodiments provide storage systems configured with functionality for IO performance control utilizing application process detection. These and other embodiments overcome the problems that can otherwise result when utilizing storage systems that differentiate performance only on the basis of a storage device or a group of storage devices.

Accordingly, some embodiments can provide different levels of performance for JO operations of different processes of an application running on a given host device even when the IO operations of the different processes are all directed to the same storage device or group of devices within a storage array.

These and other arrangements advantageously avoid the need for a user to designate separate storage devices or groups of storage devices within a storage system for handling IO operations of each of the different processes of the application, while also avoiding the complexities and potential performance impacts of the above-described conventional out-of-band hinting approach.

Some embodiments utilize suitably-modified existing SCSI commands or other standard command formats to implement process tag based IO performance control functionality. For example, one or more embodiments utilize a group number field of a command descriptor block to convey process tag information for a corresponding IO operation. Numerous alternative commands, including VU commands or other types of user-defined commands, can be used. Such arrangements facilitate the implementation of the process tag based IO performance control functionality in a wide variety of different types of shared storage systems.

Illustrative embodiments can provide significant enhancements in the orchestration of distributed applications in clustered processing systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, IO operation process tag detector 108 may be implemented at least in part in software, as indicated previously herein.

It should again be emphasized that the above-described embodiments of the invention are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO drivers, process tag detectors, priority queues and additional or alternative components. Also, the particular configurations of system and device elements and associated processing operations illustratively shown in the drawings can be varied in other embodiments. For example, a wide variety of different application process detection arrangements can be used in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A storage system comprising:
at least one storage array comprising a plurality of storage devices;
the storage array being configured to communicate over one or more networks with a plurality of host devices;
wherein the storage array is further configured:
to detect process tags assigned to respective input-output operations by a given one of the host devices, the process tags being of at least first and second distinct types so as to distinguish at least respective first and second distinct processes generating corresponding ones of the input-output operations on the given host device, the first and second distinct processes being part of at least one application running on the given host device;
responsive to a particular one of the detected process tags being of the first type, providing a first level of priority for processing of the corresponding input-output operation; and
responsive to a particular one of the detected process tags being of the second type, providing a second level of priority different than the first level of priority for processing of the corresponding input-output operation;
the storage array thereby being configured to provide different levels of priority for processing different ones of the input-output operations generated by different ones of the processes responsive to the process tags assigned to the respective input-output operations by the given host device.

2. The storage system of claim 1 wherein the process tags are assigned to the respective input-output operations by a multi-path input-output driver of the given host device.

3. The storage system of claim 2 wherein the process tags are assigned to the respective input-output operations in a kernel-space portion of the multi-path input-output driver of the given host device.

4. The storage system of claim 1 wherein the storage array comprises a plurality of priority queues having respective different priority levels and wherein the storage array is configured to provide different priority levels for different ones of the input-output operations by assigning different ones of the input-output operations to different ones of the priority queues based at least in part on their respective detected process tags.

5. The storage system of claim 4 wherein respective ones of the plurality of queues are associated with respective distinct service level objectives for processing of input-output operations in the storage array.

6. The storage system of claim 1 wherein the first and second processes comprise respective log and database processes of a database application and wherein input-output operations generated by the log process of the database application are provided with a higher priority level for processing in the storage array than input-output operations generated by the database process of the database application.

7. The storage system of claim 1 wherein the storage array is configured to direct one or more input-output operations having detected process tags of the first type and one or more input-output operations having detected process tags of the second type to storage devices having a same device type but from different priority queues.

8. The storage system of claim 1 wherein the storage array is configured to store a process name table providing a mapping between a plurality of process names and their respective process tags.

9. The storage system of claim 8 wherein the given host device is configured to read the process name table from the storage array.

10. The storage system of claim 9 wherein the given host device is configured to read the process name table from the storage array in conjunction with a boot process of the given host device.

11. The storage system of claim 1 wherein the process tags are assigned to respective ones of the input-output operations by incorporating the process tags into respective command descriptor blocks of corresponding commands directed from the given host device to the storage array.

12. The storage system of claim 11 wherein at least a portion of a given one of the process tags for one of the input-output operations is incorporated into at least one of:
a group number field of the command descriptor block of the corresponding command; and
a vendor unique field of the command descriptor block of the corresponding command.

13. The storage system of claim 11 wherein the corresponding commands directed from the given host device to the storage array comprise respective SCSI commands.

14. The storage system of claim 1 wherein the storage array is configured to provide a plurality of priority levels for respective ones of a plurality of distinct processes based at least in part on their respective process tags, including in order of decreasing priority:
a first priority level for write operations of a log process of a database application;
a second priority level for read operations of the log process of the database application;
a third priority level for read operations of a database process of the database application; and
a fourth priority level for write operations of a database process of the database application.

15. A method comprising:
configuring a storage array comprising a plurality of storage devices to communicate over one or more networks with a plurality of host devices;
detecting in the storage array process tags assigned to respective input-output operations by a given one of the host devices, the process tags being of at least first and second distinct types so as to distinguish at least respective first and second distinct processes generating corresponding ones of the input-output operations on the given host device, the first and second distinct processes being part of at least one application running on the given host device;
responsive to a particular one of the detected process tags being of the first type, providing in the storage array a first level of priority for processing of the corresponding input-output operation; and
responsive to a particular one of the detected process tags being of the second type, providing in the storage array a second level of priority different than the first level of priority for processing of the corresponding input-output operation;
the storage array thereby providing different levels of priority for processing different ones of the input-output operations generated by different ones of the processes responsive to the process tags assigned to the respective input-output operations by the given host device.

16. The method of claim 15 wherein the process tags are assigned to the respective input-output operations by a multi-path input-output driver of the given host device.

17. The method of claim 15 wherein the storage array comprises a plurality of priority queues having respective different priority levels and wherein the storage array is configured to provide different priority levels for different ones of the input-output operations by assigning different ones of the input-output operations to different ones of the priority queues based at least in part on their respective detected process tags.

18. A computer program product comprising a non-transitory processor-readable storage medium having stored therein program code of one or more software programs, wherein the program code, when executed by a storage array comprising a plurality of storage devices, the storage array being configured to communicate over one or more networks with a plurality of host devices, causes the storage array:
to detect process tags assigned to respective input-output operations by a given one of the host devices, the process tags being of at least first and second distinct types so as to distinguish at least respective first and second distinct processes generating corresponding ones of the input-output operations on the given host device, the first and second distinct processes being part of at least one application running on the given host device;
responsive to a particular one of the detected process tags being of the first type, to provide a first level of priority for processing of the corresponding input-output operation; and
responsive to a particular one of the detected process tags being of the second type, to provide a second level of priority different than the first level of priority for processing of the corresponding input-output operation;
the storage array thereby providing different levels of priority for processing different ones of the input-output operations generated by different ones of the processes responsive to the process tags assigned to the respective input-output operations by the given host device.

19. The computer program product of claim 18 wherein the process tags are assigned to the respective input-output operations by a multi-path input-output driver of the given host device.

20. The computer program product of claim 18 wherein the storage array comprises a plurality of priority queues having respective different priority levels and wherein the storage array is configured to provide different priority levels for different ones of the input-output operations by assigning different ones of the input-output operations to different ones of the priority queues based at least in part on their respective detected process tags.

\* \* \* \* \*